US008634518B2

(12) United States Patent
Ahrndt et al.

(10) Patent No.: US 8,634,518 B2
(45) Date of Patent: Jan. 21, 2014

(54) METHOD AND DEVICE FOR A DATA PROCESSING AND COMMUNICATION SYSTEM COMPRISING SUCH DEVICE

(75) Inventors: Thomas Ahrndt, Ottobrunn (DE);
Matthias Schnitter, München (DE);
Bernhard Schweyer, Bad Kohlgrub (DE); Wolfgang Zirwas, München (DE)

(73) Assignee: Nokia Siemens Networks Oy, Espoo (FI)

( * ) Notice: Subject to any disclaimer, the term of this patent is extended or adjusted under 35 U.S.C. 154(b) by 952 days.

(21) Appl. No.: 12/667,563

(22) PCT Filed: Jun. 24, 2008

(86) PCT No.: PCT/EP2008/058035
§ 371 (c)(1),
(2), (4) Date: Mar. 17, 2010

(87) PCT Pub. No.: WO2009/003880
PCT Pub. Date: Jan. 8, 2009

(65) Prior Publication Data
US 2010/0195816 A1 Aug. 5, 2010

(30) Foreign Application Priority Data
Jul. 4, 2007 (EP) .................................... 07013104

(51) Int. Cl.
*H04M 1/24* (2006.01)
(52) U.S. Cl.
USPC ........................................................ 379/1.04
(58) Field of Classification Search
USPC .................................................. 379/399.01
See application file for complete search history.

(56) References Cited

U.S. PATENT DOCUMENTS

| 7,336,627 | B1 | 2/2008 | Hasegawa et al. |
| 7,742,387 | B2 | 6/2010 | Hobbel |
| 7,826,338 | B2 | 11/2010 | Zhou |
| 2006/0274893 | A1 | 12/2006 | Cioffi et al. |
| 2007/0004286 | A1 | 1/2007 | Hobbel |
| 2008/0212768 | A1 | 9/2008 | Zhou |
| 2010/0238785 | A1 | 9/2010 | Hobbel |

FOREIGN PATENT DOCUMENTS

| EP | 0338126 A2 | 10/1989 |
| EP | 1098463 A1 | 5/2001 |
| WO | 2006110849 A2 | 10/2006 |
| WO | 2007033579 A1 | 3/2007 |

OTHER PUBLICATIONS

ITU-T G.993.1: "International Telecommunication Union; Telecommunication Standardization Sector of ITU; Series G: Transmission Systems and Media, Digital Systems and Networks", Digital Sections and Digital Line System—Access Networks Very High Speed Digital Subscriber Line Transceivers; Jun. 2004.
ITU-T G.993.2: "International Telecommunication Union; Telecommunication Standardization Sector of ITU; Series G; Transmission Systems and Media, Digital Systems and Networks", Digital Sections and Digital Line System—Access Networks; Very High Speed Digital Subscriber Line Transceivers 2 (VDSL2), Feb. 2006.

*Primary Examiner* — Mohammad Islam
(74) *Attorney, Agent, or Firm* — Laurence A. Greenberg; Werner H. Stemer; Ralph E. Locher

(57) ABSTRACT

A method and a device are provided for data processing, including the steps of transmitting a first signal from a first instance to a second instance and sending a second signal from a third instance to the first instance, wherein the second signal corresponds at least partially to the first signal as received at the third instance.

24 Claims, 2 Drawing Sheets

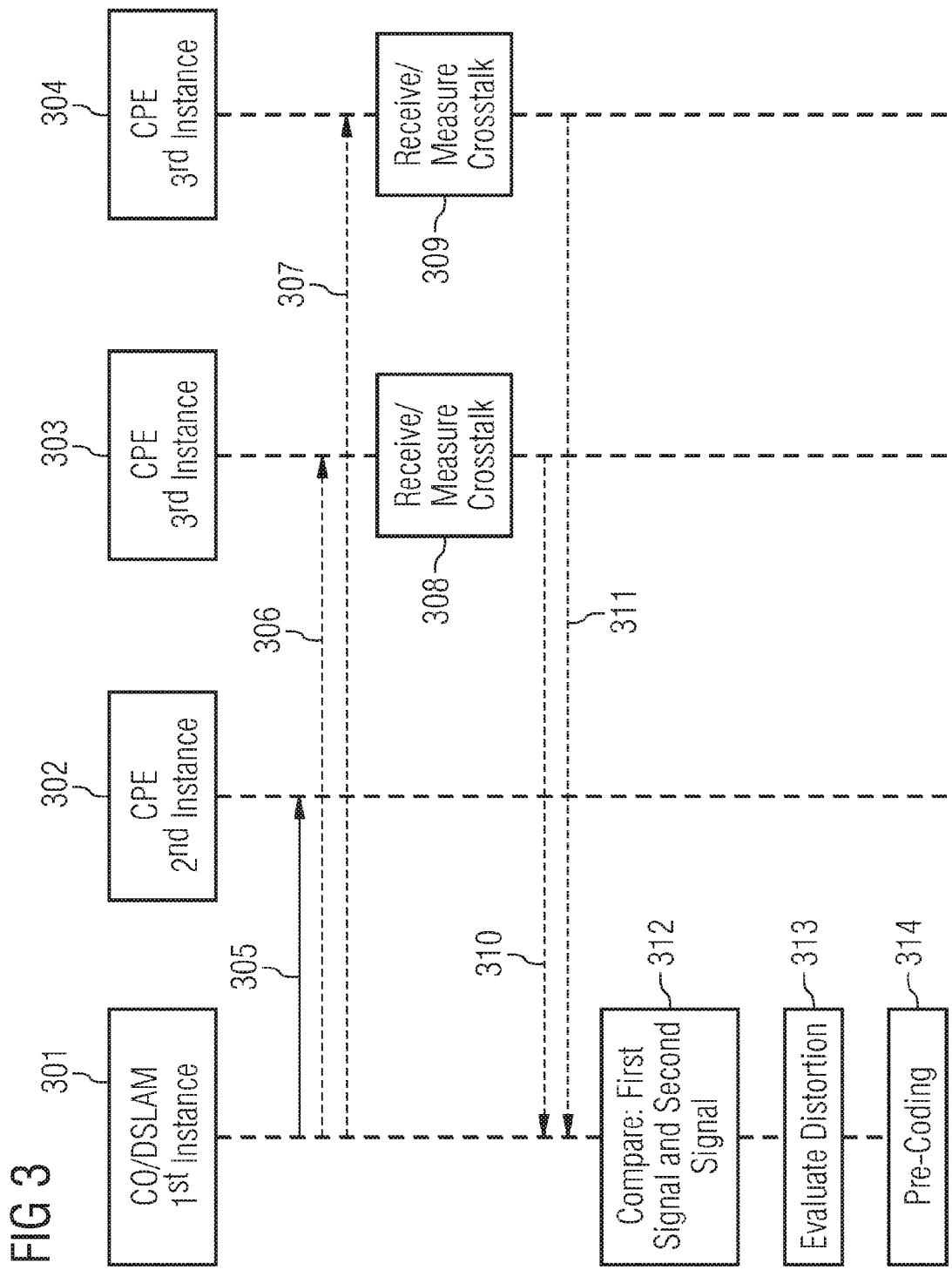

METHOD AND DEVICE FOR A DATA PROCESSING AND COMMUNICATION SYSTEM COMPRISING SUCH DEVICE

The invention relates to a method and to a device for data processing and to a system comprising such a device.

DSL or xDSL, is a family of technologies that provide digital data transmission over the wires of a local telephone network.

Asymmetric Digital Subscriber Line (ADSL) is a form of DSL, a data communications technology that enables faster data transmission over copper telephone lines than a conventional voice band modem can provide. Such fast transmission is achieved by utilizing frequencies that are normally not used by a voice telephone call, in particular, frequencies higher than normal human hearing.

VDSL (Very High Speed DSL) is an xDSL technology providing faster data transmission over a single twisted pair of wires. High bit rates are achieved at a range of about 300 meters (1000 ft), which allows for 26 Mbit/s with symmetric access or up to 52 Mbit/s in downstream—12 Mbit/s in upstream with asymmetric access.

Currently, standard VDSL uses up to 4 different frequency bands, two for upstream (from the client to the telecom provider) and two for downstream. Suitable modulation techniques are QAM (quadrature amplitude modulation) or DMT (discrete multitone modulation).

According to its high bandwidth, VDSL is capable of supporting applications like HDTV, as well as telephone services (e.g., Voice over IP) and general Internet access, over a single connection.

VDSL2 (Very High Speed Digital Subscriber Line 2) is an access technology that exploits the existing infrastructure of copper wires that were originally used for plain old telephone service (POTS). It can be deployed from central offices, from fiber-fed cabinets preferably located near the customer premises, or within buildings.

VDSL2 is designed to support the wide deployment of Triple Play services such as voice, video, data, high definition television (HDTV) and interactive gaming. VDSL2 enables operators and carriers to gradually, flexibly, and cost efficiently upgrade existing xDSL infrastructure.

ITU-T G.993.2 (VDSL2) is an enhancement to G.993.1 (VDSL) that permits the transmission of asymmetric and symmetric (full duplex) aggregate data rates up to 200 Mbit/s on twisted pairs using a bandwidth up to 30 MHz.

The xDSL wide-band modulation approaches are problematic relating to crosstalk interference that is introduced to the twisted pair transmission line and received by the modem.

Crosstalk occurs when wires are coupled, in particular between wire pairs of the same or a nearby binder that are used for separate signal transmission. Hence, data signals from one or more sources can be superimposed on and contaminate a data signal. The crosstalk comprises a near-end crosstalk (NEXT) and a far-end crosstalk (FEXT).

Based on such crosstalk, data signals transmitted over twisted-pair lines can be considerably degraded by crosstalk interference generated by one or more adjacent twisted-pair phone lines in the same and/or a nearby multi-core cable. With an increasing transmission speed, the situation even deteriorates, which may significantly limit a maximum data rate to be transmitted via a specific line.

Multi-core cables shall here be defined as cables comprising two or more twisted-pair phone lines.

The problem to be solved is to overcome the disadvantages of multi-core cables and to allow reduction of crosstalk and/or interference effects in an efficient way.

This problem is solved according to the features of the independent claims. Further embodiments result from the depending claims.

In order to overcome this problem a method is provided for data processing comprising the following steps:
- a first signal is transmitted from a first instance to a second instance;
- a second signal is sent from a third instance to the first instance, wherein the second signal corresponds at least partially to the first signal as received at the third instance.

The second signal may in particular comprise the first signal and/or a portion of the first signal as received at the third instance, in particular due to crosstalk and/or interference effects between lines connecting the second instance and the third instance with the first instance. Such lines may in particular be located within the same multi-core cable that is connected to the first instance.

Hence, this approach allows to return a crosstalk and/or interference impact of the first signal (or a portion thereof), as received at the third instance, from the third instance back to the first instance.

Upon receipt of the second signal, the first instance is able to pre-process a channel that may comprise connections (lines) to the second instance and to the third instance and thus reduce and/or compensate interference and/or crosstalk effects.

It is to be noted that the second instance and the third instance may in particular be connected to the first instance via a multi-core cable (at the first instance). Hence, there may be interference and/or crosstalk effects on adjacent lines of such multi-core cable.

The approach presented herewith allows to evaluate and to reduce or compensate crosstalk and/or interference effects at the far-end side of such multi-core cable, in particular at Customer-Premises Equipments (CPEs) by conveying feedback of such crosstalk and/or interference as it appears at the respective Customer-Premises Equipment. Such feedback is preferably sent back to the first instance, in particular to a Central Office (CO), a (remote) Cabinet and/or an Access Node as for example a Digital Subscriber Line Access Multiplexer (DSLAM), a Multi-Service Access Node (MSAN), an Optical Termination Unit (ONU) and/or a Multi-Dwelling Unit (MDU).

Preferably, the second signal is sent back to the first instance in a fault-tolerant manner, i.e. to convey the distortion, interference or crosstalk effects as it appeared at the third instance. This efficiently allows to determine the far-end crosstalk in downstream direction.

However, this approach in an analogue manner also allows to determine any crosstalk and/or interference effects in opposite, i.e. in upstream, direction.

According to an embodiment, the second instance and the third instance are connected to the first instance via adjacent lines.

These adjacent lines can be located in a multi-core cable that is connected to the first instance.

According to another embodiment, the second signal comprises interference and/or crosstalk portions.

Preferably, the second signal can be a result of a measurement conducted at the third instance, preferably at a time period when no user data is conveyed to said third instance. This allows the third instance to determine (only) crosstalk and/or interference and hence to feed back such information to the first instance.

It is also an embodiment that the second instance comprises a group of several second instances.

Hence, there may be a multitude of (different) first signals that are conveyed to a second instance or to a group of several second instances. Such second instances can be grouped together, preferably according to their presence within a multi-core cable that is connected to the first instance. In particular such grouping of second instances can be utilized for applying the first signal as it may result in various crosstalk and/or interference effects that could be received by a third instance that preferably is also within the same group of lines, i.e. within the multi-core cable.

With regard to an embodiment, the third instance comprises a group of several third instances.

Thus, not only one third instance can be utilized to determine crosstalk and/or interference effects, also a group of third instances may be utilized for such purpose.

Preferably, there is no data conveyed by the first instance to such (group of) third instance(s) when the first signal is sent to the (group of) second instance(s). Hence, the crosstalk and/or interference determined at each third instance can be fed back to the first instance thereby allowing the first instance to determine the (far-end) crosstalk and/or interference effects to a (number of) third instance(s) induced by at least one first signal to a (group of) second instance(s).

In an embodiment, the first instance, the second instance and/or the third instance are of the following type:
  a server;
  a Central Office (CO);
  a unit at a Central Office;
  a remote Cabinet;
  a unit at a remote Cabinet;
  a switch;
  a router;
  a Digital Subscriber Line Access Multiplexer (DSLAM);
  a Multi-Service Access Node (MSAN);
  an Optical Network Unit (ONU);
  a Multi-Dwelling Unit (MDU);
  a gateway;
  a Customer Premises Equipment (CPE).

In another embodiment, the first signal comprises at least one of the following signals:
  a pilot signal;
  a pilot sequence;
  a control signal;
  a reference signal;
  control and/or user data;
  a message.

The first signal can be a portion of or comprise a message that is conveyed from the first instance to the second instance. Alternatively or in addition to that, the first signal may comprise a pilot signal, a symbol, a sequence, in particular a pilot sequence, a control signal and/or sequence, a reference signal and/or any kind of control and/or user data.

It is also an embodiment that the second signal is at least a portion of the first signal as received at the third instance.

The second signal may in particular be or comprise the first signal as received at the third instance, wherein the second signal can be encoded to convey its content without any degradation back to the first instance.

It is an advantage of this approach to let the first instance know how the first signal arrived at the third instance. Such information can be used by the first instance to anticipate any degradation of the channel and hence to pre-process signals to be sent to a connected instance in order to minimize any interference and/or crosstalk effects.

Pursuant to another embodiment, the second signal comprises at least a portion with regard to a time and/or a frequency range of the first signal as received at the third instance.

Hence, it is also possible to transmit a portion of the first signal received at the third instance with regard to its time and/or frequency range. In particular, time and/or frequency ranges can be selected to be emitted by the first instance and/or to be transmitted back to the first instance.

According to an embodiment, the second signal is a measured signal at the third instance. Such measured signal may in particular be a one-time measurement or it may be based on several measurements leading for example to an average or median value.

According to another embodiment, the second signal is an analogue signal and/or a digital signal.

In yet another embodiment, the second signal may be a compressed signal.

According to a next embodiment, the second signal is sent to the first instance in a fault-tolerant mode.

Hence, it can be ensured that the information as how the channel modified the first signal transmitted from the first instance (and received by the third instance) is conveyed back to the first instance for pre-processing and/or pre-coding purposes.

Pursuant to yet an embodiment, the second signal is conveyed to the first instance via a feedback channel.

According to an embodiment, the second signal is conveyed to the first instance via messages in an overhead channel (OHC).

It is also an embodiment that the second signal is conveyed to the first instance via an upper layer protocol.

Hence, the second signal that may comprise at least a portion of the first signal as received at the third instance, can be transmitted back to the first instance by utilizing an upper layer protocol, e.g., by wrapping up the second signal within a higher level protocol data unit (PDU) that is conveyed to the first instance in particular in a fault-tolerant manner.

According to a further embodiment, the third instance is arranged such that it is able to identify a signal at least partially corresponding to the first signal to be at least partially sent back to the first instance.

With the third instance being able to recognize the first signal, i.e. a signal that—at least partially—has to be sent back to the first instance, the third instance can, e.g., utilize an upper layer protocol or mechanism to send the information corresponding to the first signal as received at the third instance back to the first instance. Such a mechanism may comprise wrapping the second signal within an upper layer protocol data unit.

As yet another embodiment the method as described herein comprises the steps:
  the second signal is received at the first instance;
  said received second signal is compared to the first signal sent to the second instance;
  crosstalk and/or interference between said first signal and said received second signal is evaluated.

Hence, it is possible to determine or evaluate distortion effects as, e.g., interference or crosstalk, by comparing the second signal as received by the first instance (that signal preferably corresponds to the first signal as received at the third instance) with the first signal as sent by the first instance to the second instance.

Any deviation can be utilized to for pre-coding and/or pre-processing purposes conducted at the first instance.

According to a further embodiment, the method described comprises the step of:

said crosstalk and/or interference is reduced or eliminated.

Thus, as a result of measuring the difference between the first signal and the second signal, crosstalk and/or interference effects may be reduced by pre-coding mechanisms applied at the first instance.

The method described herein allows to determine the impact of distortions like interference and/or crosstalk by transmitting the first signal to the second instance(s), e.g., to the devices at the user's premises. The real distortion based on, e.g., interference and/or crosstalk can be measured by receiving the first signal. The first signal as received (and/or measured) at the third instance (e.g., at the CPE) is sent back to the first instance (as said second signal) for pre-coding or pre-processing purposes.

Advantageously, said second signal comprises the distortion of the channel and hence such distortion can be compensated or reduced by calculating the channel characteristics and applying pre-distortion mechanisms, preferably at the Central Office or the remote cabinet (i.e., at the first instance).

Such scheme can be applied for several lines of a multi-core cable in sequence or in parallel in order to identify significant crosstalk and/or interference effects. Once the major interfering lines are detected, the compensating means applied (e.g., pre-processing) may significantly improve the transmission capability of the system.

The problem stated supra is also solved by a device for data processing, in particular for evaluation and/or compensation and/or cancellation of distortion and/or crosstalk and/or interference effects comprising a processor unit that is arranged and/or equipped such that the method as described herein is executable on said processor unit.

It is an embodiment that said device is a communication device, in particular a device at a user premises or a device at a Central Office or at a remote Cabinet. Said device may in particular be a Digital Subscriber Line Access Multiplexer (DSLAM).

The problem stated above is also solved by a communication system comprising the device as described herein.

Embodiments of the invention are shown and illustrated in the following figures:

FIG. 3 shows a message flow diagram between a first instance (CO/DSLAM), a second instance and two third instances, illustrating far-end crosstalk and feedback of such crosstalk to the CO/DSLAM.

Figure 1:
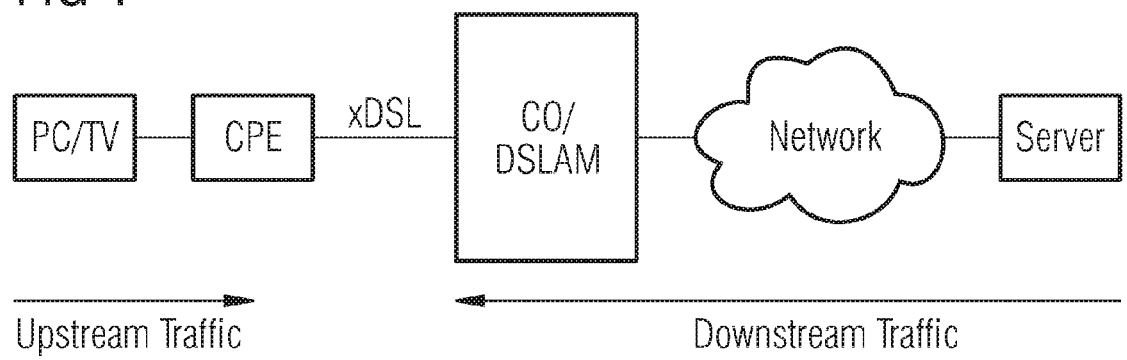
FIG. 1 shows a scenario comprising a communication network allowing to send data from a server to a client in particular via an xDSL connection.

A scenario of a communication network is shown in FIG. 1. Downstream Traffic is conveyed from the Server via a Network to a Central Office or Digital Subscriber Line Access Multiplexer CO/DSLAM. The CO/DSLAM is further connected via a digital subscriber line xDSL to a Customer-Premises Equipment CPE. The digital subscriber line connection can be in particular of the following type:

Asymmetric Digital Subscriber Line ADSL, ADSL2, ADSL2 plus;

Very High Speed Digital Subscriber Line VDSL, VDSL2.

The customer can be connected to the Customer-Premises Equipment CPE via a set-top box and a television set or via a personal computer PC/TV. Data that is sent from the PC/TV towards the Server is referred to as Upstream Traffic. Data that is sent from the Server towards the PC/TV is referred to as Downstream Traffic.

Figure 2:
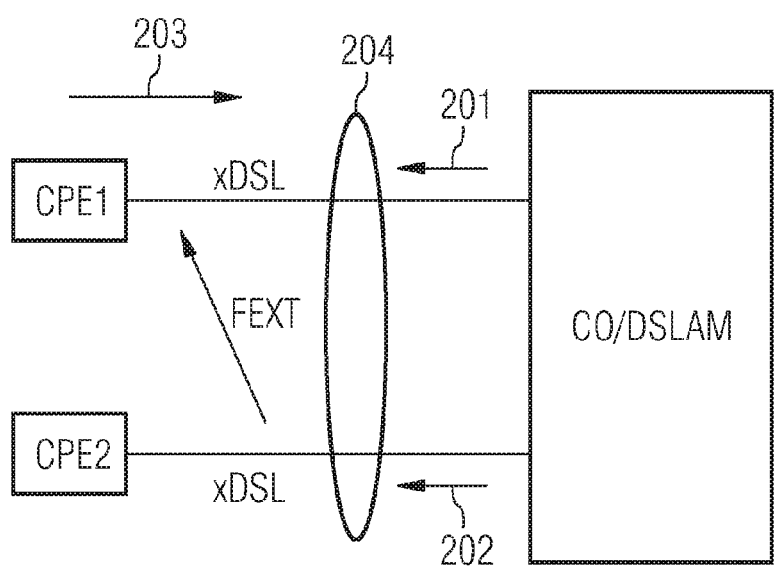
FIG. 2 shows a CO/DSLAM to which customer-premises equipments are connected via xDSL lines, in particular by a multi-core cable, thereby inducing far-end crosstalk between adjacent lines.

FIG. 2 shows a Central Office/Digital Subscriber Line Access Multiplexer (CO/DSLAM) to which Customer Premises Equipments CPE1 and CPE2 are connected, each via an xDSL connection. The connections towards the respective CPE are bundled together by a multi-core cable 204.

The CO/DSLAM ("first instance") transmits a downstream signal 202 to the CPE2 ("second instance"). In this example, the downstream signal 202 ("first signal") induces a far-end crosstalk to the connection (line) between the CO/DSLAM and the CPE1 ("third instance"). According to the approach presented herewith, such crosstalk can be identified by sending back a received signal ("second signal") from the CPE1 to the CO/DSLAM.

This approach preferably suggests providing a feedback channel 203 directed from the CPE1 to the CO/DSLAM. This feedback channel 203 can be utilized to transmit the signal received a the CPE1 back to the CO/DSLAM.

As feedback channel the following means may be utilized:
messages within an Overhead Channel (OHC) can be defined and used for submitting received signals back to the CO/DSLAM;
one or more data frames can be originated (e.g., Ethernet packets) at the CPE-side in particular together with a header to distinguish this kind of information from conventional user data;
(E.g., DSL) Sync-symbols in upstream direction.

The received signal at the CPE1 may in particular comprise:
a measurement result in a time domain and/or in a frequency domain;
the complete signal received or a portion thereof (also possible with regard to the time domain and/or the frequency domain);
a one-time measurement;
several measurements that are suitably processed, e.g., by calculating an average or a median across such several measurements.

The term "measurement" herein refers to determining the signal at the receiver before demodulation.

It is to be noted that the signal as received (e.g., corresponding to a constellation point in an I-Q-plane) is sent back to its transmitter.

As an option, the mapping of the signal fed back to the origin (here, the CO/DSLAM) can be achieved by counting (super) frames, in particular by counting frames within a superframe. Basically, as the sender (e.g., the CO/DSLAM) knows the position of the (first) signal sent, it can reconstruct the response to such signal in the feedback information by applying such counting scheme.

As shown in FIG. 2, the multi-core cable 204 comprises two connections (lines) towards Customer-Premises Equipments CPE1 and CPE2. Within such multi-core cable, distinct lines can be allocated with signals controlled by the CO/DSLAM. For example, suitable signals may be orthogonal vectors applied to different lines of the multi-core cable. Preferably, measurement of the received signal is started on one line ("measurement line") of the multi-core cable, in particular such measurement may be initiated by the respective Customer-Premises Equipment of such line. The signals applied to adjacent lines contribute to a far-end crosstalk (FEXT) and impair the signal received at said measurement line. This impaired signal is sent back to the CO/DSLAM thereby allowing the CO/DSLAM to determine crosstalk coefficients (of the multi-core cable).

Hence, based on the crosstalk coefficients, the channel (DSL transmission) can be pre-coded such that crosstalk effects can be significantly reduced. Preferably, such calculation is conducted (for the CPEs attached) at the Central Office.

Example: 50 CPEs are connected via xDSL to a DSLAM resulting in 50 lines. With regard to a particular (pre-selected) frequency range, on 49 of these 50 lines no signal is conveyed from the DSLAM to the 49 subscribers. On one line only, a signal (e.g., measurement signal, pilot signal and/or pilot sequence) is sent in this particular frequency range. On the remaining 49 lines, crosstalk effects can be measured at this particular frequency range. All 49 lines (or a portion thereof) may measure the crosstalk effect (received first signal) and convey this information back to the DSLAM. Hence, the DSLAM can calculate the crosstalk comprising as how adjacent lines interfere with each other (on the far-end) side. As stated before, this interference can be reduced by applying suitable pre-coding schemes on the DSLAM side.

This method may be repeated with a predefined pattern on varying frequency/time ranges selected on particular different lines. This may result in a higher degree of accuracy and/or it may allow to adjust to variances of the environment (cable conditions, temperature, traffic, etc.).

This approach can preferably be applied to one, all or a selection of lines in particular within a multi-core cable. Alternatively or in addition, it may be applied to a selected range of frequencies (also to one frequency only or to all frequencies or frequency ranges available).

Furthermore, the approach may be applied to determine crosstalk coefficients in upstream direction.

The feedback channel 203 of FIG. 2 can further utilize a communication protocol. It may in particular provide an independent message to the first instance, here the CO/DSLAM; and/or provide a reply based on a request sent by the first instance (CO/DSLAM).

The third instance (here CPE1) may in particular provide the information back to the CO/DSLAM via an upper layer protocol, e.g., a layer-2 or a layer-3 protocol. The CPE1 can be informed in particular in advance, e.g., via configuration, as how to unambiguously identify the message that initiates or triggers feeding back the measurement information. Hence, the CPE1 can be informed, e.g., via VLAN-ID;
MAC address;
IP address;
Ethertype;
TCP or UDP, etc.

The message to be fed back via the feedback channel 203 can be generated as follows: The downstream signal received at CPE1 via FEXT is tapped before demodulation. It may be fed back completely or partially via an upper layer protocol message to the CO/DSLAM.

FIG. 3 shows a message chart comprising messages and/or signals transmitted between a first instance 301 (CO/DSLAM), a second instance 302 (CPE) and two third instances 303 and 304.

The second instance 302 and the third instances 303 and 304 are connected at the first instance 301 via a multi-core cable. Crosstalk and/or interference is induced between adjacent lines of such multi-core cable.

A first signal 305 is transmitted from the first instance 301 to the second instance 302. The first signal can be or comprise in particular a pilot signal, a pilot sequence, a control signal, a reference signal, control data and/or user data or a message.

As the second instance 302 and the third instance 303 as well as the third instance 304 are connected with the first instance 301 via the same multi-core cable, far-end crosstalk results in a signal 306 that can be measured at the third instance 303 as well as a signal 307 that can be measured at the third instance 304.

Both signals 306 and 307 are a crosstalk result based on the first signal 305.

In order to identify the crosstalk effect, preferably no signal is sent from the first instance 301 to the third instances 303 and 304 at the time the first signal 305 is sent to the second instance 302.

In a block 308, it is indicated that the third instance 303 receives the signal 306, which in case of no data conveyed at that time by the first instance 301 to the third instance 303, represents pure interference and crosstalk from the adjacent line connecting the first instance 301 with the second instance 302. Further in the block 308, this crosstalk of the first signal is measured and fed back to the first instance 301 via a second signal 310.

The same applies in a similar manner to the third instance 304: It determines (in block 309) the crosstalk and/or interference impact based on the first signal 305 from the adjacent line connecting the first instance 301 with the second instance 302 and feeds back the crosstalk to the first instance 301 via a second signal 311.

It is to be noted that the third instance 303 or 304 can be triggered to initiate such measurement and feedback as indicated in blocks 308 and 309 in various ways:

A schedule can be defined according to which (e.g., on a regular basis) measurements are to be conducted and feedback is to be sent to the first instance.

The third instance may listen to a pre-defined type of signal and upon reception may automatically provide said feedback to the first instance.

The third instance may explicitly be triggered via the first instance to expect a measurement cycle. Hence, a subsequent message can be provided by the third instance to report the result of such measurement.

The third instance can be triggered in particular via an upper layer protocol request.

As indicated above, the result of the measurement (e.g., the second signals 310 and 311) can be provided via an upper layer protocol.

Upon receipt of the second signals 310 and 311, the first instance 301 compares (step 312) the first signal 305 sent to the second instance with the second signals 310 and 311 received as a report of the crosstalk and/or interference measured at the third instances 303 and 304. A distortion of the channel, in particular a far-end crosstalk, is evaluated in a step 313 and a pre-coding is processed in order to compensate such far-end crosstalk effects (step 314).

The approach provided allows determination of crosstalk during runtime of the components and without significant deterioration of performance.

Applying the scheme in an iterative manner allows successive improvement of the crosstalk compensation as well as adjustment to changing (environmental) parameters, e.g., cable conditions, temperature, traffic, number of CPEs connected to the CO/DSLAM via a particular or adjacent multi-core cable(s).

The invention claimed is:

1. A method for data processing in an xDSL environment, comprising the following steps:

transmitting a first signal from a central office to a first customer premises equipment via a first line;

sending a second signal from a second customer premises equipment to the central office via a feedback channel via a second line, the second signal including information on crosstalk and/or interference induced by the first signal to the second line;

receiving the second signal at the central office;

comparing said information in the second signal to the first signal; and evaluating crosstalk and/or interference between the first line and the second line.

2. The method according to claim 1, which further comprises connecting the first customer premises equipment and the second customer premises equipment to the central office via adjacent lines.

3. The method according to claim 1, wherein the second signal includes interference and/or crosstalk portions.

4. The method according to claim 1, wherein the first signal includes at least one of the following signals:
- a pilot signal;
- a pilot sequence;
- a control signal;
- a reference signal;
- control and/or user data; or
- a message.

5. The method according to claim 1, wherein the second signal is at least a portion of the first signal as received at the second customer premises equipment.

6. The method according to claim 1, wherein the second signal includes at least a portion with regard to a time and/or a frequency range of the first signal as received at the second customer premises equipment.

7. The method according to claim 1, wherein the second signal is a measured signal at the second customer premises equipment.

8. The method according to claim 7, wherein the measured signal is based on a measurement result in a time and/or frequency domain.

9. The method according to claim 7, wherein the measured signal is a one-time measurement.

10. The method according to claim 7, wherein the measured signal is based on several measurements.

11. The method according to claim 10, which further comprises processing a result of the several measurements in order to obtain the measured signal.

12. The method according to claim 11, which further comprises obtaining the measured signal by determining an average or median value across the several measurements.

13. The method according to claim 1, wherein the second signal is at least one of an analogue signal or a digital signal.

14. The method according to claim 1, wherein the second signal is a compressed signal.

15. The method according to claim 1, which further comprises sending the second signal to the central office in a fault-tolerant mode.

16. The method according to claim 1, which further comprises conveying the second signal to the central office via messages in an overhead channel.

17. The method according to claim 1, which further comprises conveying the second signal to the central office via an upper layer protocol.

18. The method according to claim 1, wherein the second customer premises equipment is configured for identifying a signal at least partially corresponding to the first signal to be at least partially sent back to the central office.

19. The method according to claim 1, which further comprises reducing or eliminating at least one of the crosstalk or interference.

20. A communication system, comprising:
a device for data processing including a processor unit configured for executing the method according to claim 1 on a processor.

21. A device for data processing in an xDSL environment configured for:
transmitting a first signal to a first customer premises equipment via a first line;
receiving a second signal sent from a second customer premises equipment to the device via a feedback channel via a second line, wherein the second signal comprises information on crosstalk and/or interference induced by the first signal to the second line;
comparing information comprised in the second signal to the first signal; and
evaluating crosstalk and/or interference between the first line and the second line.

22. The device according to claim 21, wherein the device is a central office.

23. A device for data processing in an xDSL environment configured for:
sending a second signal to a central office via a feedback channel via a second line, wherein the second signal comprises information on crosstalk and/or interference induced to the second line by a first signal transmitted from the central office to a further device via a first line for evaluation of crosstalk and/or interference between the first line and the second line by comparing the information comprised in the second signal to the first signal.

24. The device according to claim 23, wherein the device is a customer premises equipment.

* * * * *